J. W. GREEN.
POWER TRANSMISSION GEARING.
APPLICATION FILED APR. 23, 1915.
1,178,799.
Patented Apr. 11, 1916.
3 SHEETS—SHEET 1.
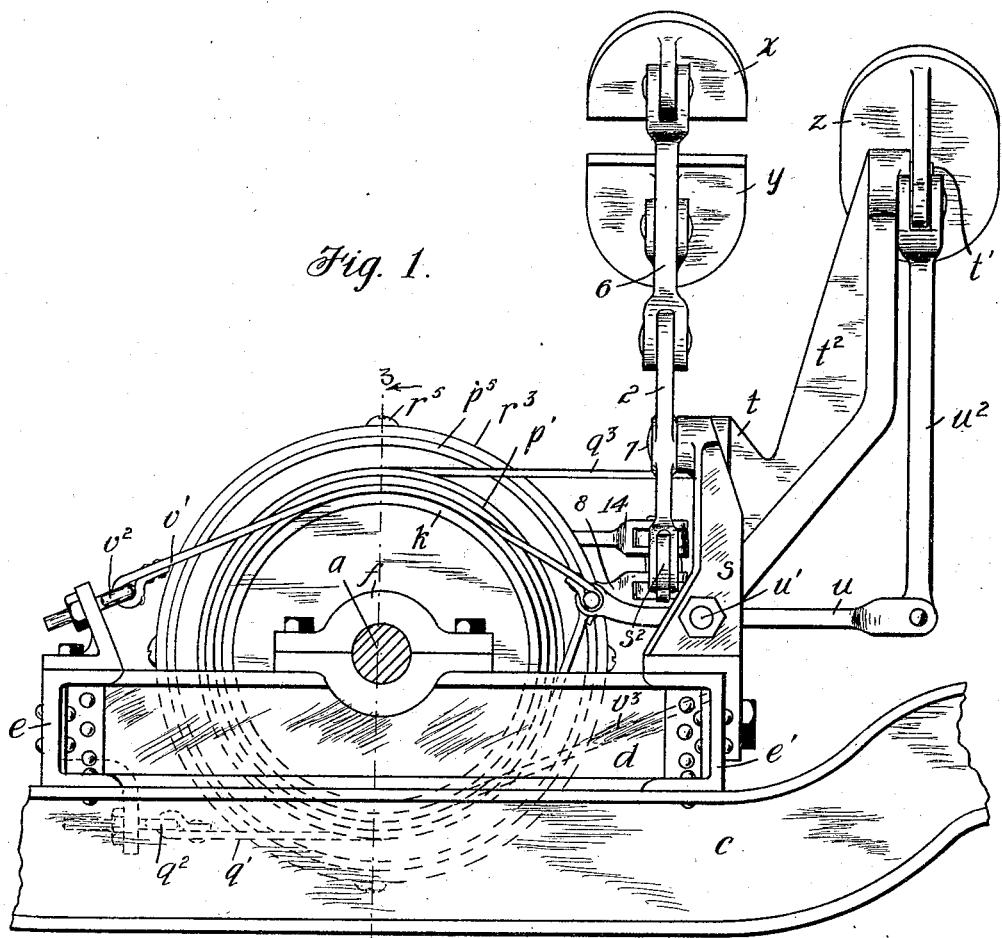
Fig. 1.
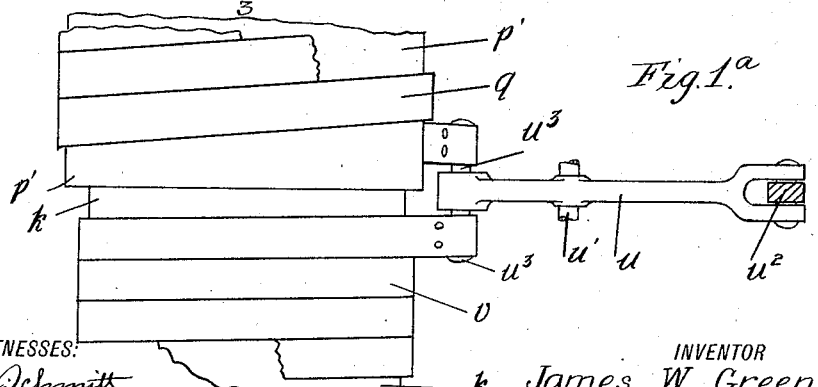
Fig. 1.ᵃ
WITNESSES:
Wm. F. Schmitt
D. E. Crabb
INVENTOR
James W. Green.
BY
ATTORNEY

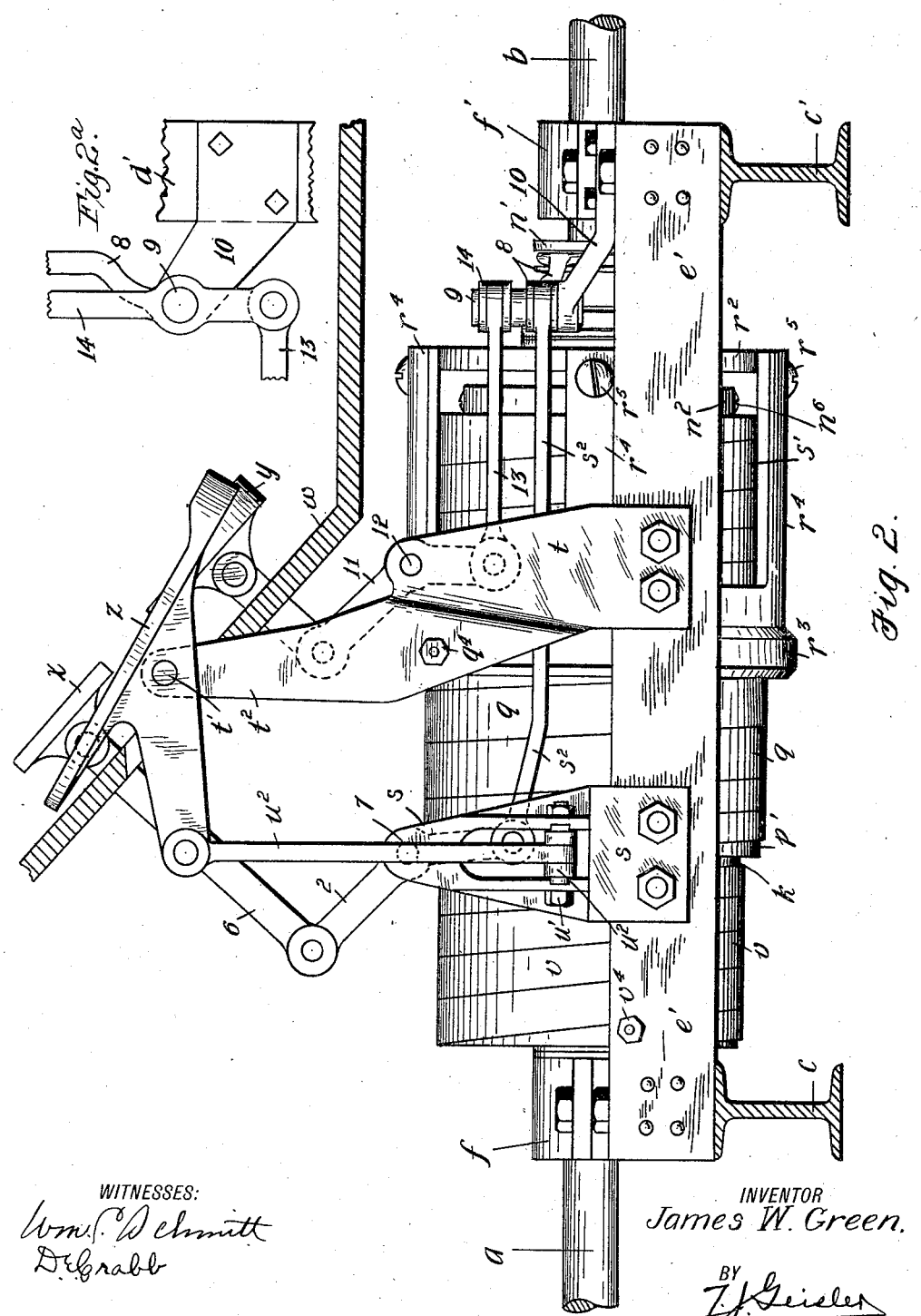

J. W. GREEN.
POWER TRANSMISSION GEARING.
APPLICATION FILED APR. 23, 1915.
1,178,799.
Patented Apr. 11, 1916.
3 SHEETS—SHEET 3.
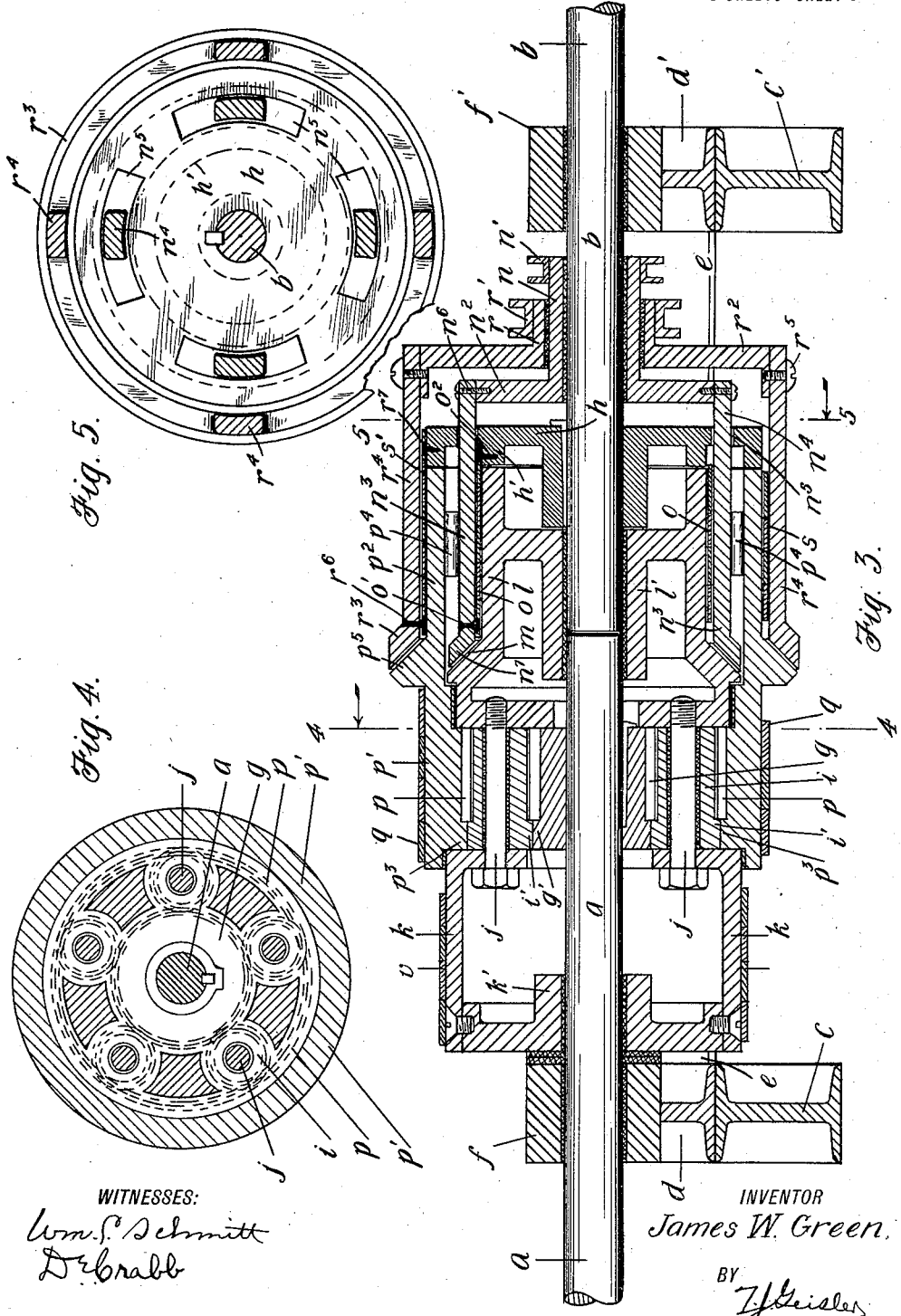
WITNESSES:
INVENTOR
James W. Green,
BY
ATTORNEY

UNITED STATES PATENT OFFICE.

JAMES W. GREEN, OF PORTLAND, OREGON.

POWER-TRANSMISSION GEARING.

1,178,799.

Specification of Letters Patent. Patented Apr. 11, 1916.

Application filed April 23, 1915. Serial No. 23,456.

*To all whom it may concern:*

Be it known that I, JAMES W. GREEN, a citizen of the United States, and a resident of Portland, county of Multnomah, and State of Oregon, have invented a new and useful Improvement in Power-Transmission Gearing, of which the following is a specification.

This invention relates to the power transmission gear mechanism, and is adapted particularly for use in connection with motor vehicles in which a variable speed transmission mechanism connects the driving and driven shafts.

One of the main objects of my invention is to provide an improved form of planetary gear transmission mechanism by means of which the constant speed of the driver may be transmitted directly or reversely to the driven shaft at the same or any differential speed.

It is further my object to use simple means for attaining the desired result.

To this end, my invention may, briefly stated, be said to consist in combining with alined driving and driven shaft members, of means for transmitting the power from the former shaft member to the latter, which means consists of a spur-gear fast on the driving shaft member, an internal gear rotatable about the spur-gear; an intermediate gear-element meshing with said spur-gear and said internal gear, means for connecting the intermediate gear and the internal gear, independently, with the driven shaft member, and means for holding the internal gear and the intermediate gear, independently, against revolving about the spur-gear.

The above-specified, and other features which emphasize my invention are hereinafter fully described and shown in the accompanying drawings, in which—

Figure 1 is a front elevation of my device; Fig. 1ᵃ is a fragmental plan view of the forward end of my device, showing the arrangement of the brake-bands; Fig. 2 is a side elevation of the parts shown in Fig. 1; Fig. 2ᵃ is a plan view showing a detail not fully shown in Fig. 2; Fig. 3 is a longitudinal vertical section along the line 3—3 of Fig. 1; Fig. 4 is a transverse vertical section on the line 4—4 of Fig. 3; and Fig. 5 is a similar view taken on the line 5—5 of Fig. 3.

In these drawings, $a$ represents a drive-shaft of a power transmission mechanism, said drive-shaft being connected directly with the motor, which is not shown. The driven shaft of the power transmission mechanism is indicated by $b$ and this driven shaft is the propeller shaft of the vehicle by means of which the power is transmitted to the drive-wheels, the latter also not being shown.

$c$, $c'$ are transverse I-beams of the chassis on which the mechanism is mounted.

$d$, $d'$ and $e$, $e'$ are frame sections riveted together to form the frame of my device. A bearing box $f$ is fixed on the frame member $d$, and a bearing box $f'$ is fixed on the frame member $d'$. These bearing boxes are in alinement with each other, and form the journals in which the shafts $a$ and $b$ are mounted respectively.

Keyed on the shaft $a$ is a spur gear $g$ made with a hub $g'$ and keyed on the shaft $b$ is a spider $h$. The intermediate gear elements of my invention comprise the pinions $i$, provided with hubs $i'$, which roll on the hub $g'$ of the spur-gear $g$. Said pinions are rotatably mounted on the bolts $j$, and these bolts also form a rigid connection between a brake-band cylinder $k$ and a clutch cylinder $l$, these two cylinders being located on opposite sides of the intermediate pinions $i$, as shown in Fig. 3. The cylinder $k$ is provided with a center hub $k'$, bearing on the shaft $a$, and the clutch cylinder $l$ is provided with a center hub $l'$, which bears on the adjacent ends of the shafts $a$ and $b$. The clutch cylinder $l$ is furthermore provided with a clutch cone face $m$. A companion clutch member adapted to be engaged with the clutch cylinder $l$ comprises a cylindrical sleeve $n$, rotatably mounted on the shaft $b$, said sleeve being made with a shifter collar $n'$ and a spider $n^2$. A cylinder $n^3$ concentric with and encircling the cylinder $l$, is provided at its rear end with arms $n^4$, which project through arcuate slots $n^5$ of the spider $h$, and are fixed to the spider $n^2$ by means of the screws $n^6$. A clutch-cone-face $n^7$ is adapted to engage with the clutch cone face $m$ of the clutch cylinder $l$, whenever the two parts are thrust together. The spider $h$ is provided with a flange $h'$, and a brake-strap $o$ has one end affixed to the inner face of the cylinder $n^3$ by a rivet $o'$, being then wrapped around the clutch cylinder and has its other end affixed to the flange $h'$ by a rivet $o^2$, as shown in Fig. 3.

An internal gear $p$ is made with an integral brake-band cylinder $p'$, and a clutch cylinder $p^2$. An internal hub $p^3$ bears on the hubs $i'$ of the pinions $i$, and a roller-bearing element $p^4$ is interposed between the inner surface of the clutch cylinder $p^2$ and the cylinder, $n^3$, so as to facilitate the rotation of these parts relative to each other. The clutch cylinder $p^2$ is furthermore provided with a clutch-cone face $p^5$. A companion clutch member adapted to be engaged with the clutch cylinder $p^2$ comprises a sleeve $r$ rotatably journaled on the sleeve $n$; a shifter collar $r'$ being fixed on the end of said sleeve $r$ by means of which this clutch member may be moved longitudinally. The sleeve $r$ is made with an integral spider $r^2$, and the clutch cone $r^3$, provided with longitudinally projecting arms $r^4$, is fixed to the spider $r^2$ by the screws $r^5$. A brake-band $s'$ is fixed at one end to the clutch cone $r^3$ by a rivet $r^6$, being then wrapped around the clutch cylinder $p^2$, and has its other end fixed to the periphery of the spider $h$, by the rivet $r^7$. Rigidly fixed on the frame member $e'$ are the brackets $s$ and $t$.

$w$ represents the foot-board of the automobile, in connection with which the mechanism is shown, and $x$, $y$ and $z$ are the foot-pedals by means of which the transmission mechanism is controlled. The foot-lever $z$ is rotatably mounted on a pivot $t'$ at the upper end of a vertically extending arm $t^2$ of the bracket $t$. Said foot-pedal $z$ is made in the form of a bell-crank, and is adapted to be rocked either clock-wise or counter-clockwise. A lever $u$ is pivoted on a stud $u'$ in the bracket $s$ (see Fig. 1) and the outer end of this lever is connected directly to the foot-pedal $z$, by means of a link $u^2$. On the inner end of the lever $u$ is a lateral pin $u^3$, extending outward from both sides of the lever. A brake-band $v$ is wrapped around the intermediate gear brake-band cylinder $k$ one end of said band being riveted around one end of the lateral pin $u^3$. The other end of the band $v$ is divided and one part $v'$ is adjustably anchored to an eye-bolt $v^2$ in the frame member $e$, and the other part $v^3$ is similarly anchored to a bolt $v^4$ in the frame member $e'$. A second brake-band $q$ is wrapped around the internal gear brake-band cylinder $p'$, this brake-band being wrapped in an opposite direction to that of the brake-band $v$. One end of the brake-band $q$ is riveted around the other end of the pin $u^3$. The other end of the band $q$ is divided, and one part $q'$ is adjustably anchored to an eye-bolt $q^2$ in the frame member $e$, and the other end $q^3$ is similarly anchored to a bolt $q^4$ in the frame member $e'$. In this way, when the foot-pedal $z$ is rocked counter-clockwise, as shown in Fig. 2, the lever $u$ will be rocked clockwise, (see Fig. 1) with the result that the brake-band $q$ will be tightened on the internal gear brake-band cylinder $p'$ so as to hold the internal gear element stationary. This same lever action will slacken the brake-band $v$ on the intermediate gear cylinder so as to allow said intermediate gear element to revolve freely. In this way, the mere rocking of the foot-pedal $z$ will hold either the internal gear element or the intermediate gear element stationary, with the result that the usual epicylic gear action will transmit a differential rotation to the other gear element which is not so held.

The foot-pedal $x$ is connected to a bell-crank 2 by a link 6, said bell-crank 2 being pivoted on a stud 7 in the bracket $s$ (see Figs. 1 and 2). A gear shifter lever 8 is pivoted on a stud 9 of a bracket 10 (see Fig. 2ᵃ), and said gear shifter lever engages with the shifter collar $n'$ of the companion clutch member of the intermediate gear element. A link $s^2$ connects the bell-crank 2 and the shifter-lever 8, so that when the foot-pedal $x$ is depressed, the clutch cone faces $m$ and $n^7$ will be thrust into engagement. The consequent differential rotation of the spider $h$ and the cylinder $n^3$ will tighten the brake-band $o$, about the clutch cylinder $l$, so as to lock the cylinder $n^3$ and spider $h$ together. In this way, the differential movement of the intermediate gear element caused by the holding of the internal gear element will be transmitted directly to the shaft $b$.

The foot-pedal $y$ is connected to a bell-crank 11, which is pivoted on the stud 12, in the bracket $t$. A link 13 connects the bell-crank 11 to a clutch-shifter 14, the latter also pivoted on the stud 9, and engaged with the shifter-collar $r'$, so that when said pedal is depressed, the internal-gear companion clutch member will be moved longitudinally until the clutch cone faces $p^5$ and $r^3$ are thrust into engagement. The resulting differential rotation of the spider $h$ and cylinder $p^2$ will tighten the brake-band $s'$ around the cylinder $p^2$ so as to lock the cylinder $p^2$ and spider $h$ together. In this way, the differential rotation of the internal gear element caused by holding the intermediate gear element stationary, will be transmitted directly to the shaft $b$.

The general operation of my device is as follows: When full speed ahead is to be transmitted from the drive-shaft $a$ to the driven shaft $b$, both pedals $x$ and $y$ are depressed and the pedal $z$ is left in neutral position. This action locks both intermediate, internal and spur-gear elements together so that the whole gearing rotates as a unit, and shafts $a$ and $b$ rotate together at the same speed. When it is desired to drive forward at half speed, the pedal $z$ is rocked counter-clockwise and the internal gear element will thereupon be held stationary while the intermediate gear element revolves in the same direction as the driven shaft $a$, but at a differential speed. By depressing the foot lever $x$, as previously explained, the the intermediate gear clutch-members will be thrown into engagement so as to lock the shaft $b$ with the intermediate gear element, with the result that the driven shaft $b$ will be rotated at the same differential speed and in the same direction as said intermediate gear element. When it is desired to reverse the direction of rotation and drive backward, at a differential speed, the foot pedal $z$ is rocked clockwise, so as to thereby hold the intermediate gear element stationary. This action will cause the internal gear element to rotate reversely at a differential speed, and by depressing the foot-pedal $y$, the internal gear clutch members will be thrown into engagement so as to thereby lock the shaft $b$ with said internal gear element. The shaft $b$ will then be driven in the same direction and at the same differential speed as the internal gear element. Whenever any of the foot-pedals are released, the tension in the relieved brake-bands will cause all parts to automatically disengage themselves.

I claim:

1. In a power transmission machanism, the combination with alined driving and driven-shaft-members, of a spur-gear fast on the driving shaft member, two sleeves rotatable on the driven shaft-member, one of such sleeves having an internal gear, the other having rotatably mounted thereon an intermediate gear element meshing with the spur-gear and the internal gear, said sleeves each having a clutch-element, the companion clutch-elements being longitudinally movable on, and rotating with the driven shaft-member, means for operating such companion clutch-elements, and means for holding said sleeves independently against rotation.

2. In a power transmission mechanism, the combination with alined driving and driven shaft-members, of a spur-gear fast on the driving shaft member, two concentric sleeves rotatable about each other on the driven shaft-member, the outer of such sleeves having an internal gear, the inner having rotatably mounted thereon an intermediate gear element meshing with the spur gear and the internal gear, said sleeves each having a clutch-element, the companion clutch-elements being longitudinally movable on, and rotating with the driven shaft-member; means for operating such companion clutch-elements, and means for holding said sleeves independently against rotation.

3. In a power transmission mechanism, the combination with alined driving and driven shaft-members, of a spur-gear fast on the driving shaft member, two sleeves rotatable on the driven shaft-member, one of such sleeves having an internal gear, the other having rotatably mounted thereon an intermediate gear element meshing with the spur gear and the internal gear, said sleeves each having a clutch-element, the companion clutch-elements being longitudinally movable on, and rotating with the driven shaft-member; means for operating such companion clutch-elements, means for holding said sleeves independently against rotation, and operating to release one sleeve while engaging the other.

4. In a power transmission mechanism, the combination with alined driving and driven shaft-members, of a spur-gear fast on the driving shaft member, two sleeves rotatable on the driven shaft-member, one of such sleeves having an internal gear, the other having rotatably mounted thereon an intermediate gear element meshing with the spur-gear and the internal gear, said sleeves each having a clutch element; the companion clutch-elements being longitudinally movable on, and rotating with the driven shaft-member; means for operating such companion clutch-elements, and a brake-band on each sleeve, and a pedal engaged with such brake-bands and operating to release one when tightening the other.

5. In a power transmission mechanism, the combination with alined driving and driven shaft-members, of a spur-gear fast on the driving shaft-member, a sleeve rotating and bearing on both shaft members; an intermediate gear-element rotatably mounted on said sleeve and meshing with said spur-gear, a sleeve bearing on the driven shaft member and rotatable about the first-mentioned sleeve, and having an internal gear meshing with said intermediate gear-element, said sleeves having each a clutch element; concentric clutch-elements longitudinally movable on, and rotating with the driven shaft, a disk fast on the driven shaft, a yielding connection between such disk and said companion clutch-elements, respectively, and adapted to permit the so-connected parts slight relative movement, the outer of said sleeves revolving between said companion clutch elements, and roller-bearing between the outer sleeve and the inner clutch elements, and means for holding said sleeves independently against rotation.

6. In a power transmission mechanism, the combination with alined driving and driven shaft-members, of a spur-gear fast on the driving shaft-member, a sleeve rotating and bearing on both shaft members; an intermediate gear-element rotatably mounted on said sleeve and meshing with said spur-gear, a sleeve bearing on the driven shaft member and rotatable about the first-mentioned sleeve, and having an internal gear meshing with said intermediate gear-element, said sleeves having each a clutch element, concentric clutch elements longitudinally movable on, and rotating with the driven shaft, a disk fast on the driven shaft, a yielding connection between such disk and said companion clutch-elements, respectively, and adapted to permit the so-connected parts slight relative movement, the outer of said sleeves revolving between said companion clutch elements; bearing rollers between the outer sleeve and the inner companion clutch elements, means for holding said sleeves independently against rotation, and operating to release one sleeve while engaging the other.

7. In a power transmission mechanism, the combination with alined driving and driven shaft-members, of a spur-gear fast on the driving shaft-member, a sleeve rotating and bearing on both shaft members; an intermediate gear-element rotatably mounted on said sleeve and meshing with said spur-gear, a sleeve bearing on the driven shaft member and rotatable about the first-mentioned sleeve, and having an internal gear meshing with said intermediate gear-element, said sleeves having each a clutch element, concentric clutch elements longitudinally movable on, and rotating with the driven shaft, a disk fast on the driven shaft, a yielding connection between such disk and said companion clutch-elements, respectively, and adapted to permit the so-connected parts slight relative movement, the outer of said sleeves revolving between said companion clutch elements; bearing rollers between the outer sleeve and the inner companion clutch elements, a brake-band on each sleeve, and a pedal engaged with such brake-bands and operating to release one when tightening the other.

JAMES W. GREEN.

Witnesses:
W. C. SCHMITT,
D. E. CRABB.

Copies of this patent may be obtained for five cents each, by addressing the "Commissioner of Patents, Washington, D. C."